United States Patent
Kang et al.

(10) Patent No.: US 9,148,790 B2
(45) Date of Patent: Sep. 29, 2015

(54) FREQUENCY ALLOCATION METHOD AND DEVICE FOR A FREQUENCY SHARING SYSTEM IN AN ENVIRONMENT WHERE A PRIMARY LICENSING SYSTEM IS PRESENT

(75) Inventors: Hyunduk Kang, Daejeon (KR); Heon Jin Hong, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 540 days.

(21) Appl. No.: 13/497,918

(22) PCT Filed: Sep. 20, 2010

(86) PCT No.: PCT/KR2010/006458
§ 371 (c)(1),
(2), (4) Date: Mar. 23, 2012

(87) PCT Pub. No.: WO2011/037386
PCT Pub. Date: Mar. 31, 2011

(65) Prior Publication Data
US 2012/0208582 A1    Aug. 16, 2012

(30) Foreign Application Priority Data

Sep. 24, 2009  (KR) .................. 10-2009-0090378
Aug. 6, 2010   (KR) .................. 10-2010-0076081

(51) Int. Cl.
*H04W 16/14* (2009.01)
*H04W 72/04* (2009.01)
*H04W 72/08* (2009.01)

(52) U.S. Cl.
CPC .......... *H04W 16/14* (2013.01); *H04W 72/0453* (2013.01); *H04W 72/08* (2013.01)

(58) Field of Classification Search
CPC .. H04W 16/14; H04W 72/08; H04W 72/0453
USPC ....................... 455/450–452.1, 509
See application file for complete search history.

(56) References Cited

U.S. PATENT DOCUMENTS

| 8,451,917 B2 * | 5/2013 | Rao et al. ............... 375/260 |
| 2008/0259811 A1 * | 10/2008 | Cordeiro et al. ....... 370/252 |
| 2009/0040974 A1 | 2/2009 | Goldhamer |
| 2010/0330919 A1 * | 12/2010 | Gurney et al. ........ 455/67.11 |

FOREIGN PATENT DOCUMENTS

| KR | 1020070041343 A | 4/2007 |
| KR | 1020080036879 A | 4/2008 |
| KR | 1020090025123 A | 3/2009 |
| KR | 1020090044678 A | 5/2009 |
| KR | 1020090100152 A | 9/2009 |

* cited by examiner

*Primary Examiner* — Raymond Dean
(74) *Attorney, Agent, or Firm* — William Park & Associates Ltd.

(57) ABSTRACT

Provided is a method and apparatus for assigning a frequency in an environment where an incumbent system exists. In a frequency environment where the incumbent system exists, a frequency resource management may be smoothly performed using a plurality of frequency sets classified based on a utilization state of each sub-frequency resource. When a frequency sharing system using the same radio access technology (RAT) as a frequency sharing system to be assigned with a frequency resource exists, it is possible to reduce overhead for frequency sharing by priorly assigning a corresponding frequency resource to the frequency sharing system to be assigned with the frequency resource.

16 Claims, 6 Drawing Sheets

FREQUENCY ALLOCATION METHOD AND DEVICE FOR A FREQUENCY SHARING SYSTEM IN AN ENVIRONMENT WHERE A PRIMARY LICENSING SYSTEM IS PRESENT

TECHNICAL FIELD

The present invention relates to a method and apparatus for assigning a frequency in an environment where an incumbent system exists.

BACKGROUND ART

Due to the development in radio communication technologies and the introduction of new radio communication services, there has been a desire to more effectively use a finite frequency resource. To enhance a frequency utilization efficiency, a spectrum efficiency optimization scheme through a performance optimization of a radio communication system and a scheme of minimizing interference with another radio communication system, and the like have been used. The performance optimization may be, for example, a multiple access scheme, an encoding technology, a modulation efficiency, an information compression technology, and the like.

In addition to the above schemes, a frequency sharing method is proposed to enhance a frequency utilization efficiency in a currently using frequency band such as a television (TV) band.

DISCLOSURE OF INVENTION

Technical Goals

An aspect of the present invention provides a method and apparatus for assigning a frequency in an environment where an incumbent system exists.

Another aspect of the present invention also provides a method that may classify a frequency set according to a sub-frequency resource utilization state of a frequency sharing system and an incumbent system in an environment where the incumbent system exists, and thereby may manage a frequency resource for effective frequency sharing.

Another aspect of the present invention also provides a method that may manage a frequency resource for effective frequency sharing when frequency sharing systems using different radio technologies coexist to share a channel unused by an incumbent system, in an environment where the incumbent system exists.

Technical Solutions

According to an aspect of the present invention, there is provided a method of assigning a frequency in an environment where an incumbent system exists, the method comprising: determining whether a sub-frequency resource solely assignable to a frequency sharing system discriminated from the incumbent system exists, the sub-frequency resource being generated by dividing a target frequency resource assigned to the incumbent system; determining whether a sub-frequency resource assigned to a frequency sharing system using the same radio access technology (RAT) as the frequency sharing system exists, when the sub-frequency resource solely assignable to the frequency sharing system does not exist; and assigning the sub-frequency resource to the frequency sharing system based on the decisions.

The determining whether the sub-frequency resource solely assignable to the frequency sharing system exists may include determining whether an available sub-frequency resource that is unused by the incumbent system and satisfies at least predetermined channel quality and thus, is solely assignable to the frequency sharing system exists. The assigning may include the available sub-frequency resource to the frequency sharing system when the available sub-frequency resource exists.

The determining whether the sub-frequency resource solely assignable to the frequency sharing system exists may include whether a restrictively available sub-frequency resource restrictively assignable to the frequency sharing system according to a frequency band related regulation exists, when the available sub-frequency resource does not exist.

The determining whether the restrictively available sub-frequency resource exists may include determining that the sub-frequency resource solely assignable to the frequency sharing system does not exist, when the restrictively available sub-frequency resource does not exist.

The determining whether the restrictively available sub-frequency resource exists may include determining whether the frequency sharing system is capable of satisfying a regulation about the restrictively available sub-frequency resource when the restrictively available sub-frequency resource exists. The assigning may include assigning the restrictively available sub-frequency resource to the frequency sharing system to satisfy the regulation about the restrictively available sub-frequency resource, when the frequency sharing system is capable of satisfying the regulation.

The determining whether the frequency sharing system is capable of satisfying the regulation about the restrictively available sub-frequency resource may include determining that the sub-frequency resource solely assignable to the frequency sharing system does not exist when the frequency sharing system is incapable of satisfying the regulation.

The assigning may include assigning, to the frequency sharing system, the sub-frequency resource assigned to only the frequency sharing system using the same RAT, when the sub-frequency resource assigned to only the frequency sharing system using the same RAT exists.

The assigning of the sub-frequency resource assigned to only the frequency sharing system using the same RAT may include priorly assigning, to the frequency sharing system, a sub-frequency resource assigned to a relatively small number of frequency sharing systems among sub-frequency resources assigned to the frequency sharing system using the same RAT.

The assigning of the sub-frequency resource may include assigning, to the frequency sharing system, a sub-frequency resource assigned to a frequency sharing system using a different RAT when the sub-frequency resource assigned to the frequency sharing system using the same RAT does not exist.

The assigning of the sub-frequency resource assigned to the frequency sharing system using the different RAT may include priorly assigning, to the frequency sharing system, the sub-frequency resource assigned to a relatively small number of frequency sharing systems among sub-frequency resources assigned to the frequency sharing system using the different RAT.

The frequency assignment method may further include obtaining assignment information associated with the sub-frequency resource.

According to another aspect of the present invention, there is provided an apparatus for assigning a frequency in an environment where an incumbent system exists, the apparatus comprising: a decision unit to determine whether a sub-frequency resource solely assignable to a frequency sharing system discriminated from the incumbent system exists, the sub-frequency resource being generated by dividing a target frequency resource assigned to the incumbent system, and to determine whether a sub-frequency resource assigned to a frequency sharing system using the same RAT as the frequency sharing system exists, when the sub-frequency resource solely assignable to the frequency sharing system does not exist; and a sub-frequency resource assignment unit to assign the sub-frequency resource to the frequency sharing system based on the decisions.

The decision unit may determine whether an available sub-frequency resource that is unused by the incumbent system and satisfies at least predetermined channel quality and thus, is solely assignable to the frequency sharing system exists. When the available sub-frequency resource exists, the sub-frequency resource assignment unit may assign the available sub-frequency resource to the frequency sharing system.

When the available sub-frequency resource does not exist, the decision unit may determine whether a restrictively available sub-frequency resource restrictively assignable to the frequency sharing system according to a frequency band related regulation exists.

When the restrictively available sub-frequency resource does not exist, the decision unit may determine that the sub-frequency resource solely assignable to the frequency sharing system does not exist.

When the restrictively available sub-frequency resource exists, the decision unit may determine whether the frequency sharing system is capable of satisfying a regulation about the restrictively available sub-frequency resource. When the frequency sharing system is capable of satisfying the regulation, the sub-frequency resource assignment unit may assign the restrictively available sub-frequency resource to the frequency sharing system to satisfy the regulation about the restrictively available sub-frequency resource.

When the frequency sharing system is incapable of satisfying the regulation, the decision unit may determine that the sub-frequency resource solely assignable to the frequency sharing system does not exist.

When the sub-frequency resource assigned to only the frequency sharing system using the same RAT exists, the sub-frequency resource assignment unit may assign, to the frequency sharing system, the sub-frequency resource assigned to only the frequency sharing system using the same RAT.

When the sub-frequency resource assigned to the frequency sharing system using the same RAT does not exist, the sub-frequency resource assignment unit may assign, to the frequency sharing system, a sub-frequency resource assigned to a frequency sharing system using a different RAT.

The frequency assignment apparatus may further include an information obtainment unit to obtain assignment information associated with the sub-frequency resource.

According to embodiments of the present invention, a frequency assignment apparatus or a frequency sharing system may readily verify available channel information by classifying a plurality of frequency sets based on a utilization state of each sub-frequency resource. Accordingly, it is possible to effectively assign a frequency to a plurality of frequency sharing systems by employing a plurality of frequency sets.

Also, according to embodiments of the present invention, when an available channel, for example, an available sub-frequency resource exists, it is possible to solve a coexistence issue between frequency sharing systems by enabling a single frequency sharing system to use the available channel solely.

Also, according to embodiments of the present invention, when an available channel does not exist, it is possible to enhance an efficiency of frequency sharing by priorly assigning a sub-frequency resource used by a frequency sharing system using the same radio access technology (RAT) rather than a sub-frequency resource used by a different frequency sharing system using a different RAT. When the different frequency sharing system shares the sub-frequency resource, great overhead may be used for collaboration between systems.

BEST MODE FOR CARRYING OUT THE INVENTION

Figure 1:
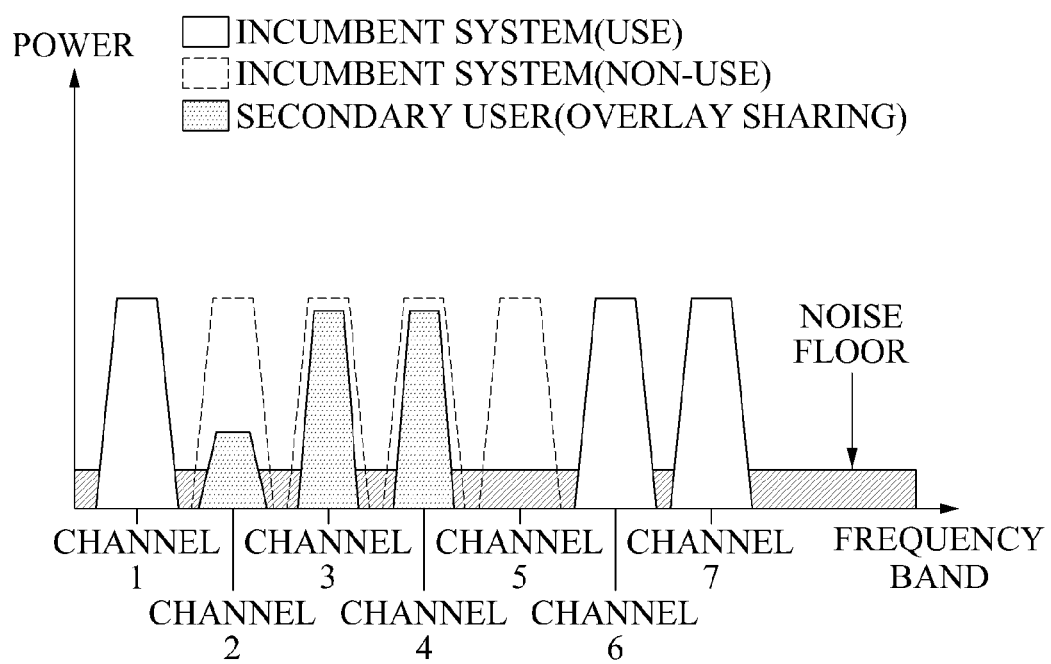
FIG. 1 is a diagram illustrating an example of a frequency sharing scheme in an environment where an incumbent system exists according to a related art.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

When it is determined detailed description related to a related known function or configuration they may make the purpose of the present invention unnecessarily ambiguous in describing the present invention, the detailed description will be omitted here. Also, terms used herein are defined to appropriately describe the exemplary embodiments of the present invention and thus may be changed depending on a user, the intent of an operator, or a custom. Accordingly, the terms must be defined based on the following overall description of this specification.

FIG. 1 is a diagram illustrating an example of a frequency sharing scheme in an environment where an incumbent system exists according to a related art.

A frequency sharing technology may include a spectrum overlay scheme that may use an empty frequency, while not causing interference to the incumbent system, when the incumbent system does not use a frequency over time and based on a region. A television (TV) system may be a representative example of the incumbent system. A cognitive radio technology may represent a spectrum overlay sharing scheme.

Referring to FIG. 1, the incumbent system is using a channel 1, a channel 6, and a channel 7. Specifically, a channel 2 through a channel 5 may correspond to a frequency unused by the incumbent system. Accordingly, a secondary user, for example, a frequency sharing system may use the channel 2 through the channel 5 within the range of not causing the interference to the incumbent system. For example, since the channel 2 is adjacent to the channel 1 being used by the incumbent system, the to channel 2 may be available under a particular condition that a relatively low transmit power is used, and the like, which is to protect the incumbent system.

Frequency sharing in a frequency band used by the incumbent system such as a TV band may be performed with the assumption that the interference may not be given to the incumbent system. Accordingly, the frequency sharing may be different from frequency sharing when the incumbent system does not exist, such as an Industrial, Scientific, and Medical (ISM) band. Specifically, in the case of a frequency resource in the environment where the incumbent system exists, all the channels within a frequency band may not be readily used by the frequency sharing system, which is different from the ISM scheme.

Accordingly, to verify whether a channel available by the frequency sharing system exists by determining whether the incumbent system uses a channel becomes an issue. In addition, when a plurality of different frequency sharing systems exists, a coexistence issue may occur due to a difference of a radio access technology (RAT) between the frequency sharing systems, and the like. Therefore, according to an embodiment of the present invention, there may be provided a method of appropriately managing a channel used by a frequency sharing system.

According to an embodiment of the present invention, frequency sets may be defined as follows, so that various frequency sharing systems corresponding to secondary users may more readily share a frequency in a frequency environment where an incumbent system exists. The frequency sets may be defined as follows:

The term "operating set" indicates a set of sub-frequency resources assigned to a single frequency sharing system. A sub-frequency resource indicates a portion of the entire frequency band that may be used by the incumbent system. The sub-frequency resource may be represented by a channel.

The term "coexistent set" indicates a set of sub-frequency resources assigned to at least two frequency sharing system using the same RAT or different RATs.

The term "available set" indicates a set of sub-frequency resources that are unused by the incumbent system and satisfy at least predetermined level of channel quality, and thus, are assignable to the at least one frequency sharing system. The sub-frequency resources included in the available set may not be assigned to a frequency sharing system.

The term "protected set" indicates a set of sub-frequency resources that are used by the incumbent system and thus, are not assignable to a frequency sharing system.

The term "restricted available set" indicates a set of sub-frequency resources that are restrictively assignable to at least one frequency sharing system according to a frequency band related regulation. For example, a sub-frequency resource of which an adjacent sub-frequency resource is used by the incumbent system and thus, that may be restrictively assignable to the frequency sharing system may belong to the restricted available set. In this instance, an adjacent sub-frequency resource of an $F^{th}$ sub-frequency resource may be defined as an $(F\pm1)^{th}$ sub-frequency resource, an $(F\pm2)^{th}$ sub-frequency resource, and the like. A sub-frequency resource included in the restricted available set may not be assigned to any frequency sharing system.

Here, restrictively possible assignment indicates that a corresponding frequency assigned to the frequency sharing system with the assumption that a low power sufficiently distinguishable from a power used by the incumbent system is used in an adjacent sub frequency resource of the corresponding frequency.

The term "disallowed set" indicates a set of sub-frequency resources disallowed to be used by the frequency sharing system according to a frequency band related regulation.

The term "unclassified set" indicates a set of sub-frequency resources that do not correspond to the above six frequency classifications. Specifically, the unclassified set indicates a set of sub-frequency resources of which states are unverified.

The term "allowed set" indicates a set of sub-frequency resources allowed to be used by the frequency sharing system according to the frequency band related regulation. Specifically, the allowed set corresponds to a complementary set of the disallowed set. Also, the available set, the restricted available set, the operating set, the coexistent set, the protected set, and the unclassified set correspond to subsets of the allowed set.

Information associated with sub-frequency resources belonging to the frequency sets may be obtained from a storage unit storing location information of the frequency sharing system, a spectrum sensing result, or information associated with a frequency resource utilization of the incumbent system. Information associated with the sub-frequency resources belonging to the frequency sets may be periodically updated by an updating unit.

When the incumbent system is verified to use a sub-frequency resource being used by the frequency sharing system through the periodical updating of the frequency sets, the frequency sharing system may need to immediately suspend using of the corresponding sub-frequency resource.

Figure 2:
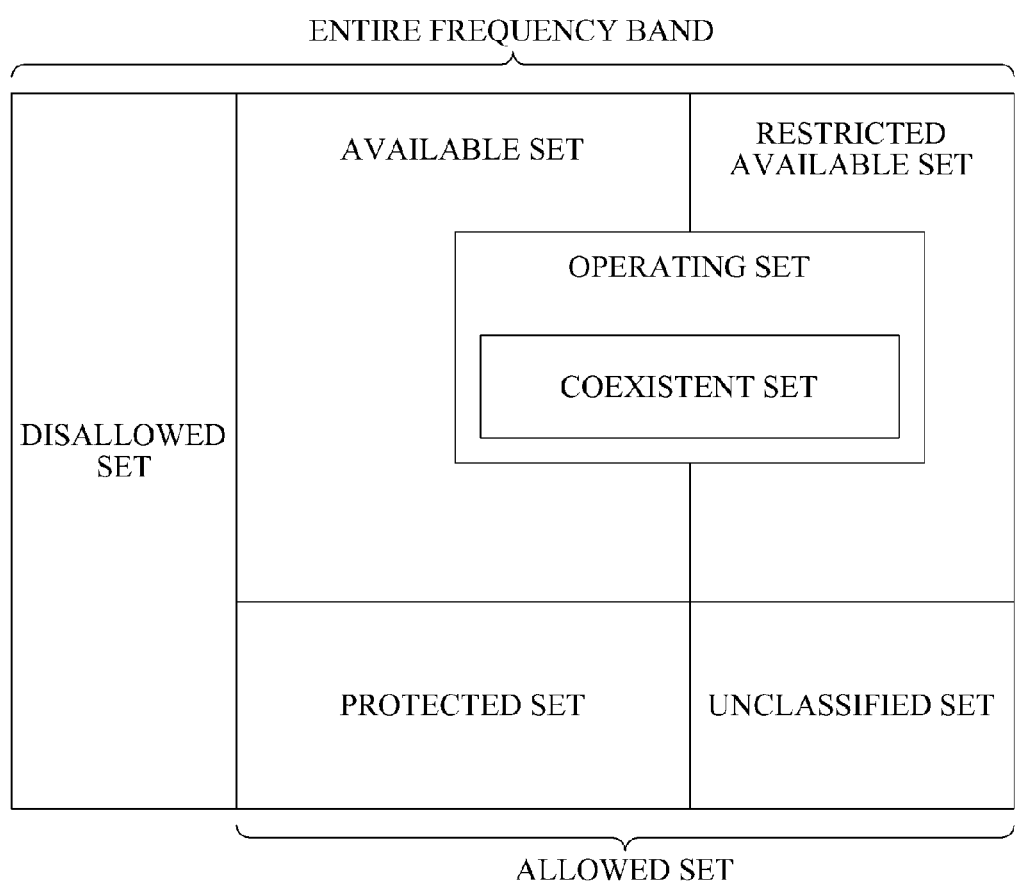
FIG. 2 is a Venn diagram about frequency sets according to an embodiment of the present invention.

FIG. 2 is a Venn diagram about frequency sets according to an embodiment of the present invention.

Referring to FIG. 2, the entire frequency band assigned to an incumbent system may be generally divided into a disallowed set and an allowed set. The allowed set may include an available set, a restricted available set, a protected set, and an unclassified set.

Among sub-frequency resources allowed to be used by a frequency sharing system according to a frequency band related regulation, a sub-frequency resource being used by the incumbent system may belong to the protected set. A sub-frequency resource that is unused by the incumbent system and satisfies at least predetermined level of channel quality and thus, is assignable to at least one frequency sharing system may belong to the available set. A sub-frequency resource that is restrictively assignable to the at least one frequency sharing system according to the frequency band related regulation may belong to the restricted available set. A sub-frequency resource of which a state is unverified in associated with frequency sharing may belong to the unclassified set.

An operating set may include a portion of sub-frequency resources excluding sub-frequency resources belonging to the protected set and the unclassified set from sub-frequency resources belonging to the allowed set. In particular, when a sub-frequency resource belonging to the operating set is released, the sub-frequency resource may belong to the available set or the restricted available set.

Similarly, a coexistent set may include a portion of sub-frequency resources excluding the sub-frequency resources belonging to the protected set and the unclassified set from the sub-frequency resources belonging to the allowed set. In particular, when only a single frequency sharing system assigned with a sub-frequency resource belonging to the coexistent set remains, the corresponding sub-frequency resource may belong to the operating set.

Figure 3:
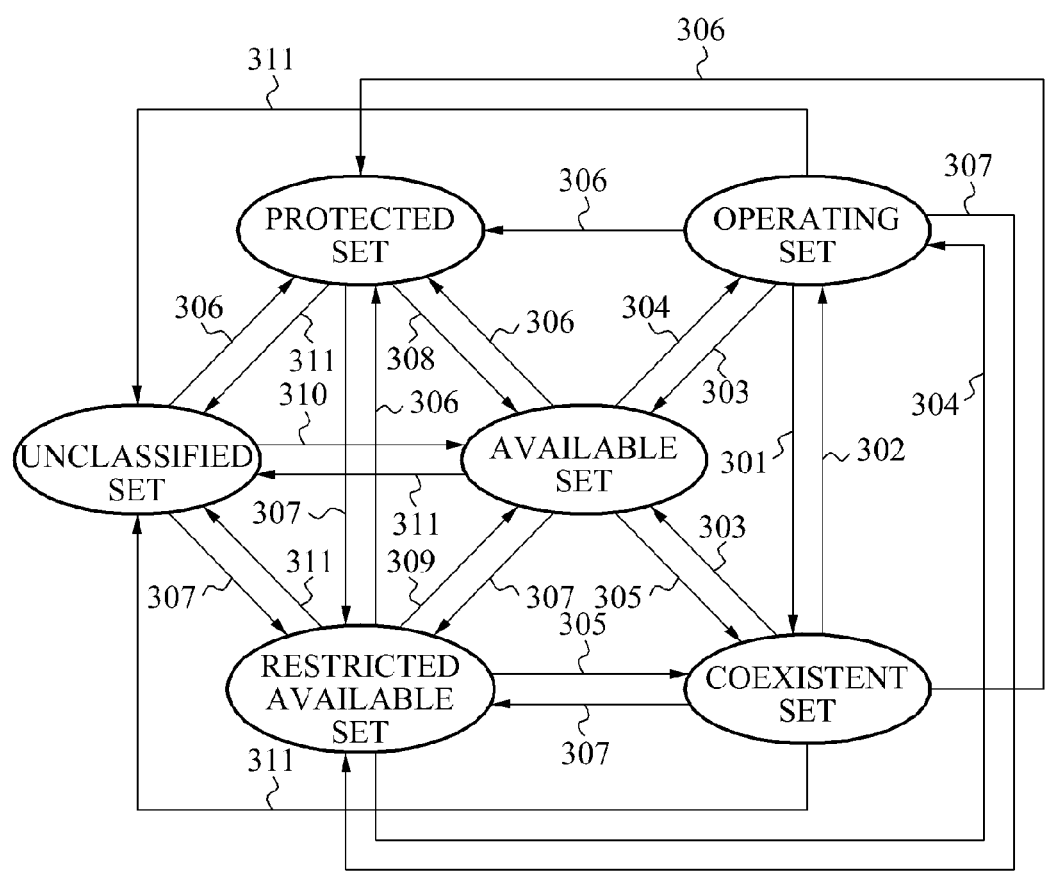
FIG. 3 is a diagram illustrating a frequency set shift process with respect to a particular sub-frequency resource based on a change in a sub-frequency resource utilization state of a frequency sharing system and an incumbent system according to an embodiment of the present invention.

FIG. 3 is a diagram illustrating a frequency set shift process with respect to a particular sub-frequency resource based on a change in a sub-frequency resource utilization state of a frequency sharing system and an incumbent system according to an embodiment of the present invention.

Referring to FIG. 3, six frequency sets, for example, an operating set, a coexistent set, an available set, a protected set, a restricted available set, and an unclassified set may exist. In the case of the particular sub-frequency resource, a frequency set belonged by the particular sub-frequency resource may vary as follows depending on the sub-frequency resource utilization state of the incumbent system and the frequency sharing system.

When a sub-frequency resource being used by a first frequency sharing system is assigned to be shared by a second frequency sharing system, the sub-frequency resource may change to belong to the coexistent set, from the operating set, as indicated by an arrow indicator 301.

When at least two frequency sharing systems share a sub-frequency resource, however, only a single frequency sharing system remains, the sub-frequency resource may change to belong to the operating set, from the coexistent set, as indicated by an arrow indicator 302.

When a utilization of a frequency sharing system with respect to a sub-frequency band is completed and a corresponding sub-frequency resource is released, and when the quality of the corresponding sub-frequency resource is greater than or equal to a predetermined reference value, the corresponding sub-frequency resource may change to belong to the available set, from the operating set, as indicated by an arrow indicator 303.

When a single frequency sharing system is assigned with a new sub-frequency resource, the new sub-frequency resource may change to belong to the operating set, from the available set or the restricted available set. As indicated by an arrow indicator 304, it may correspond to a case where the corresponding sub-frequency resource is assigned to only a corresponding frequency sharing system by assigning the corresponding sub-frequency resource to the frequency sharing system. For example, when the corresponding sub-frequency resource is assigned to a single frequency sharing system satisfying a restricted utilization condition of the corresponding sub-frequency resource, the corresponding sub-frequency resource may change to belong to the operating set, from the restricted available set.

When at least two frequency sharing systems are simultaneously assigned with the same sub-frequency resource, the corresponding sub-frequency resource may change to belong to the coexistent set, from the available set or the restricted available set, as indicated by an arrow indicator 305. For example, when the same sub-frequency resource is simultaneously assigned to the at least two frequency sharing systems satisfying a restricted utilization condition of the corresponding sub-frequency resource, the corresponding sub-frequency resource may change to belong to the coexistent set, from the restricted available set.

When the incumbent system appears in a sub-frequency resource included in the operating set, the coexistent set, the available set, the restricted available set, or the unclassified set, the sub-frequency resource may change to belong to the protected set, from the operating set, the coexistent set, the available set, the restricted available set, or the unclassified set, as indicated by an arrow indicator 306. For example, when the incumbent system using an adjacent sub-frequency resource of the sub-frequency resource completes the utilization of the adjacent sub-frequency resource and simultaneously appears in the sub-frequency resource, the sub-frequency resource may change to belong to the protected set, from the restricted available set.

When a sub-frequency resource included in the operating set, the coexistent set, the protected set, or the unclassified set becomes restrictively assignable to a frequency sharing system according to a frequency band related regulation, the sub-frequency resource may change to belong to the restricted available, from the operating set, the coexistent set, the available set, or the unclassified set, as indicated by an arrow indicator 307. For example, when the incumbent system completes a utilization of the sub-frequency resource and simultaneously appears in an adjacent sub-frequency resource of the sub-frequency resource, the sub-frequency resource may be restrictively assignable to the frequency sharing system and thus, the sub-frequency resource may change to belong to the restricted available set, from the protected set.

When the incumbent system completes a utilization of a corresponding sub-frequency resource and thereby, the corresponding sub-frequency resource is released and when a quality of the corresponding sub-frequency resource is greater than or equal to a predetermined reference value, the corresponding sub-frequency resource may change to belong to the available set, from the protected set, as indicated by an arrow indicator 308.

When the incumbent system completes a utilization of an adjacent sub-frequency resource of a corresponding sub-frequency resource and thereby, the corresponding sub-frequency resource is released and when a quality of the corresponding sub-frequency resource is greater than or equal to a predetermined reference value, the corresponding sub-frequency resource may change to the available set, from the restricted available set, as indicated by an arrow indicator 309.

When a sub-frequency resource belonging to the unclassified set is verified to be unused by the incumbent system or a frequency sharing system, and to have a quality of greater than or equal to a predetermined reference value, the sub-frequency resource may change to belong to the available set, from the unclassified set, as indicated by an arrow indicator 310.

When a verification of a sub-frequency resource state for updating a frequency set fails with respect to a sub-frequency resource included in the operating set, the coexistent set, the available set, the protected set, or the restricted available set, the sub-frequency resource may change to belong to the unclassified set, from the operating set, the coexistent set, the available set, the protected set, or the restricted available set, as indicated by an arrow indicator 311. Here, the failure of the verification of the sub-frequency resource state indicates that the verification of the sub-frequency resource state is not performed within a predetermined period of time.

Although not shown in figures, it may be apparent to those skilled in the art that the shift process between frequency sets may be applicable according to the aforementioned principle. According to an embodiment of the present invention, it is possible to readily verify a utilization state of a sub-frequency resource by defining a frequency set indicating the utilization state of the sub-frequency resource.

Figure 4:
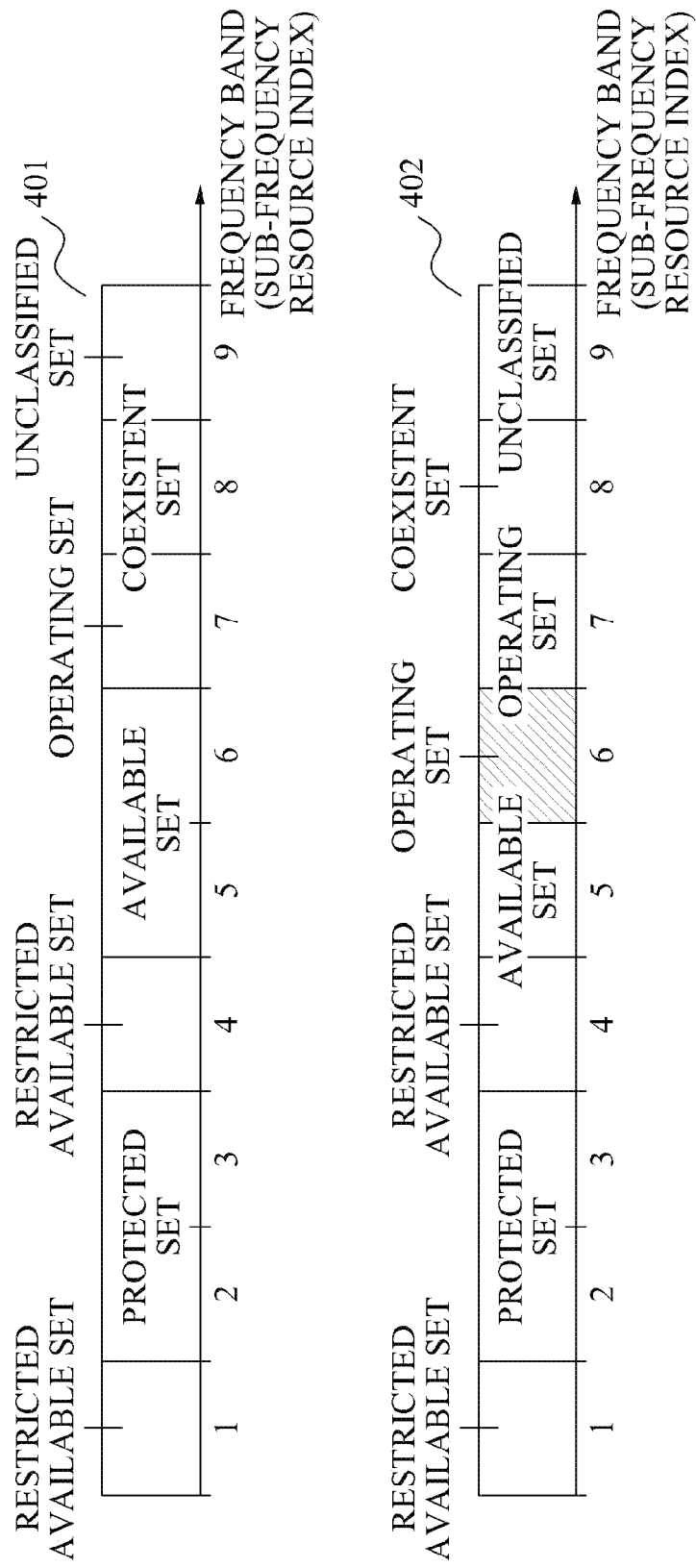
FIG. 4 is a diagram illustrating a frequency utilization state before and after a sub-frequency resource belonging to an available set among target frequency resources of an incumbent system is assigned to a frequency sharing system according to an embodiment of the present invention.

FIG. 4 is a diagram illustrating a frequency utilization state before and after a sub-frequency resource belonging to an available set among target frequency resources of an incumbent system is assigned to a frequency sharing system according to an embodiment of the present invention.

Referring to FIG. 4, it is assumed that the incumbent system includes, for example, a total of nine sub-frequency resources.

A table 401 shows a frequency utilization state before a sub-frequency resource belonging to an available set is assigned to the frequency sharing system.

A second sub-frequency resource and a third sub-frequency belong to a protected set and thus, may be used by the incumbent system.

A first sub-frequency resource and a fourth sub-frequency resource belong to a restricted available set and thus, may be restrictively assignable to the frequency sharing system according to a frequency band related regulation. For example, the first sub-frequency resource and the fourth sub-frequency resource are respectively adjacent to the second sub-frequency resource and the third sub-frequency resource used by the incumbent system and thus, may be restrictively assignable based on a power condition.

A fifth sub-frequency resource and a sixth sub-frequency resource belong to the available set. Accordingly, it can be known that the fifth sub-frequency resource and the sixth sub-frequency resource are not being used by the incumbent system and the frequency sharing system. The fifth sub-frequency resource and the sixth sub-frequency resource belong to the available set and thus, may satisfy at least predetermined channel quality assignable to at least one frequency sharing system.

A seventh sub-frequency resource belongs to an operating set. Accordingly, it can be known that the seventh sub-frequency resource is already assigned to a single frequency sharing system.

An eight sub-frequency resource belongs to a coexistent set. Accordingly, it can be known that the eight sub-frequency resource is assigned to at least two frequency sharing systems.

A ninth sub-frequency resource belongs to an unclassified set. Accordingly, it can be known that information associated with an assignment of the ninth sub-frequency resource is unknown.

A table 402 shows a frequency utilization state after a sub-frequency resource belonging to the available set is assigned to the frequency sharing system.

A difference between the table 401 and the table 402 is the sixth sub-frequency resource. Specifically, the sixth sub-frequency resource belongs to the available set in the table 401, however, belongs to the operating set in the table 402. Accordingly, it can be known that the sixth sub-frequency resource is assigned to the single frequency sharing system.

When an assignment request with respect to the frequency sharing system is received, a corresponding sub-frequency resource may be assigned. From viewpoint of a frequency assignment entity, it can be known from the table 401 that the fifth frequency band and the sixth frequency correspond to spare sub-frequency resources. Here, the spare sub-frequency resources may indicate sub-frequency resources belonging to the available set or the restricted available set. Accordingly, the sixth sub-frequency resource that is one of the spare sub-frequency resources may be assigned to a first frequency sharing system. Information associated with the frequency sets where sub-frequency resources belong may be stored in a storage unit of a frequency assignment apparatus. Even though the first sub-frequency resource and the fourth sub-frequency resource belonging to the restricted available set may be spare sub-frequency resources, a sub-frequency resource belonging to the available set may be priorly assigned.

Hereinafter, an example of a case where another frequency sharing system further exists in the table 402 will be described as follows. Since the fifth sub-frequency resource remains in the available set, the frequency assignment apparatus may priorly assign the fifth sub-frequency resource to a second frequency sharing system.

When a third frequency sharing system additionally exists, the restricted available set may be considered since no more sub-frequency resource remains in the available set. For example, when a regulation for assigning the first sub-frequency resource or the fourth sub-frequency resource is satisfied, the first sub-frequency resource or the fourth sub-frequency resource may be assigned to the third frequency sharing system.

When the regulation of the restricted available set is unsatisfied, the operating set or the coexistent set may be considered. For example, among the fifth through the eight sub-frequency resources, a sub-frequency resource assigned to only a frequency sharing system employing the same RAT as the third sub-frequency sharing system may be priorly assigned.

Hereinafter, a method of assigning a sub-frequency resource according to an embodiment of the present invention will be described.

Figure 5:
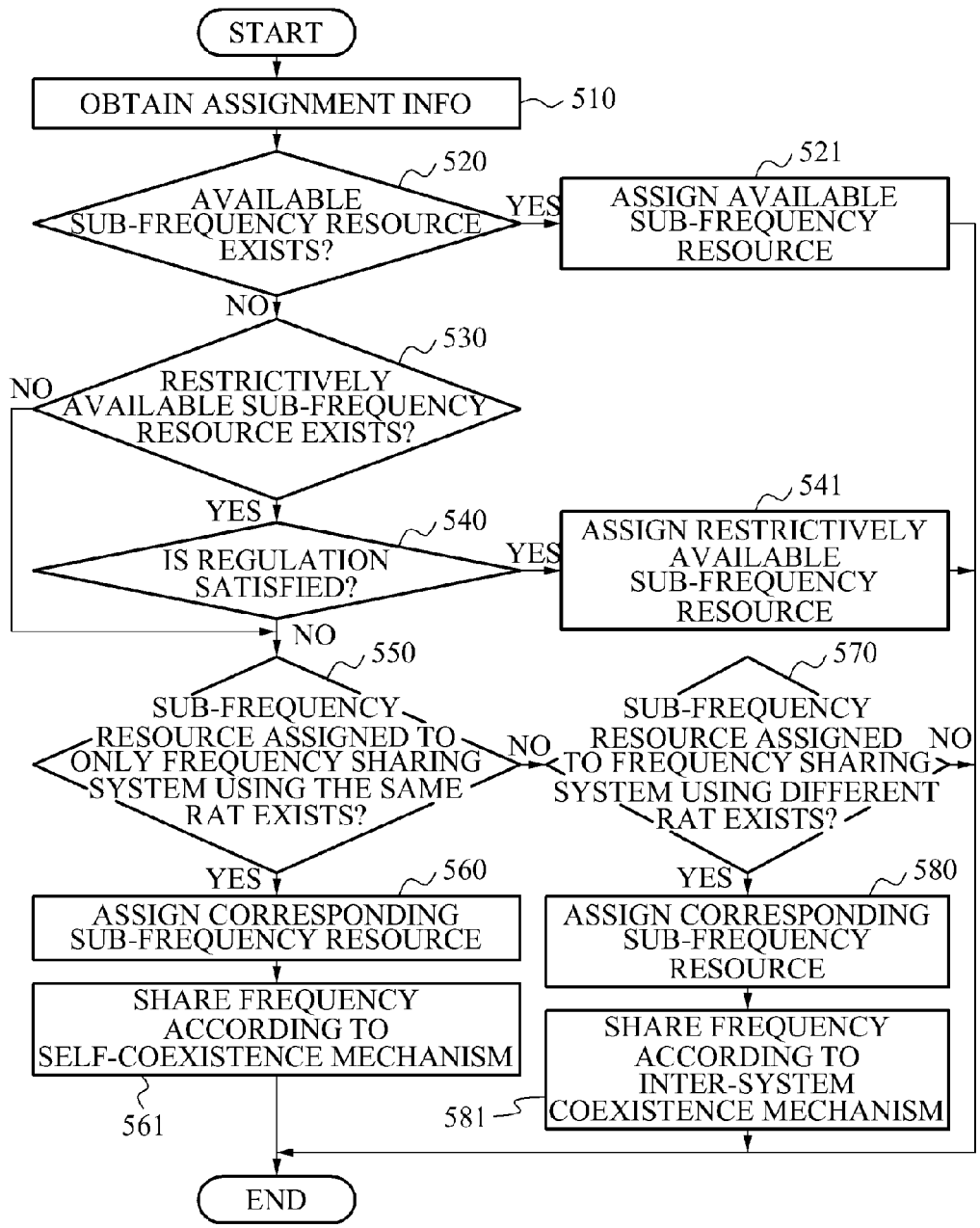
FIG. 5 is a flowchart illustrating a method of assigning a sub-frequency resource according to an embodiment of the present invention.

FIG. 5 is a flowchart illustrating a method of assigning a sub-frequency resource according to an embodiment of the present invention.

Referring to FIG. 5, in a frequency assignment method in an environment where an incumbent system exists, assignment information associated with the sub-frequency resource may be obtained in operation 510. For example, the frequency assignment method may obtain sub-frequency utilization information of the incumbent system and frequency sharing systems using a plurality of frequency sets. Each of the frequency sets may indicate a characteristic of a sub-frequency resource included in a corresponding frequency set. Frequency utilization information may be obtained based on location information of the frequency sharing systems, a spectrum sensing result, or information associated with a channel utilization of the incumbent system.

The frequency assignment method may assign at least one sub-frequency resource, belonging to one of the frequency sets, to at least one frequency sharing system discriminated from the incumbent system. Specifically, at least one sub-frequency resource belonging to an available set, a restricted available set, an operating set, or a coexistent set may be assigned to at least one frequency sharing system. Hereinafter, a scheme of assigning a sub-frequency resource to a first frequency sharing system will be described as an example.

Initially, the frequency assignment method may determine whether a spare sub-frequency resource exists. The spare sub-frequency resource may include an available sub-frequency resource included in the available set, or a restrictively available sub-frequency resource included in the restricted available set, satisfying a frequency band related regulation. Specifically, the spare sub-frequency resource indicates a sub-frequency resource that may be solely assignable to the frequency sharing system.

When the spare sub-frequency resource exists, at least one sub-frequency resource among sub-frequency resources corresponding to the spare sub-frequency resources may be assigned to the first frequency sharing system. Specifically, a corresponding sub-frequency band may be assigned solely to the first frequency sharing system.

Hereinafter, a process of assigning the spare sub-frequency resource will be further described. In operation 520, the frequency assignment method may determine whether an available sub-frequency resource exists. When the available sub-frequency resource exists, the frequency assignment method may assign the available sub-frequency resource to the first frequency sharing system in operation 521. In this case, the first frequency sharing system may use the available sub-frequency resource solely.

Conversely, when the available sub-frequency resource does not exist, the frequency assignment method may determine whether a restrictively available sub-frequency resource exists in operation 530. When the restrictively available sub-frequency resource exists, the frequency assignment method may determine whether a band related regulation is satisfied in order to assign the restrictively available sub-frequency in operation 540.

In operation 541, when the band related regulation is satisfied, the restrictively available sub-frequency resource may be assigned to the first frequency sharing system in operation 541. In this case, the first frequency sharing system may use the restrictively available sub-frequency resource solely.

When the restrictively available sub-frequency resource does not exist, or when the restrictively available sub-frequency resource exists, however, the band related regulation is unsatisfied, that is, when a sub-frequency resource individually assignable to the first frequency sharing system does not exist, the frequency assignment method may determine whether a sub-frequency resource assigned to only a frequency sharing system using the same RAT as the first frequency sharing system exists in operation 550.

When the sub-frequency resource assigned to only the frequency sharing system using the same RAT exists, the frequency assignment method may assign the sub-frequency resource to the first frequency sharing system in operation 560. Specifically, the frequency sharing system using the same RAT and the first frequency sharing system may share the sub-frequency resource. In this instance, among corresponding sub-frequency resources, a sub-frequency resource assigned to a relatively small number of frequency sharing systems may be priorly assigned. When a single frequency sharing system using the same RAT is assigned with the corresponding sub-frequency resource, the corresponding sub-frequency resource may change to belong to the coexistent set, from the operating set, by assigning the corresponding sub-frequency resource to the first frequency sharing system.

In operation 561, the first frequency sharing system in the corresponding sub-frequency resource and the frequency sharing system using the same RAT may share a frequency according to a self-coexistence mechanism and thereby enhance an efficiency of frequency sharing.

In operation 570, when the sub-frequency resource assigned to only the frequency sharing system using the same RAT does not exist, the frequency assignment method may determine whether a sub-frequency resource assigned to a frequency sharing system using a different RAT exists in operation 570.

When the sub-frequency resource assigned to the frequency sharing system using the different RAT exists, the frequency assignment method may assign, to the first frequency sharing system, the sub-frequency resource assigned to the frequency sharing system using the different RAT may be assigned to the first frequency sharing system in operation 580. Specifically, frequency sharing systems using different RATs may share the corresponding sub-frequency resource. In this instance, among corresponding sub-frequency resources, a sub-frequency resource assigned to a relatively small number of frequency sharing systems may be priorly assigned. When a single frequency sharing system using the different RAT is assigned with the corresponding sub-frequency resource, the corresponding sub-frequency resource may change to belong to the coexistent set, from the operating set, by assigning the corresponding sub-frequency resource to the first frequency sharing system.

In operation 581, the first frequency sharing system in the corresponding sub-frequency resource and the frequency sharing system using the different RAT may share frequency according to an inter-system coexistence mechanism and thereby enhance an efficiency of frequency sharing.

When the sub-frequency resource assigned to the frequency sharing system using the different RAT does not exist, the frequency assignment method may wait until information associated with the frequency sets is updated, and then attempt again a frequency assignment.

Information associated with the frequency sets may be periodically updated, or may be updated as necessary, for example, an assignment request and the like. An assignment of the sub-frequency resource may be repeated every time a frequency set is updated.

As described above, a frequency assigning method according to an embodiment of the present invention may priorly assign a spare sub-frequency resource to a frequency sharing system, and may assign, to the frequency sharing system, a sub-frequency resource in an order of a sub-frequency resource used by a frequency sharing system using the same RAT and a sub-frequency resource used by a frequency sharing system using a different RAT.

Accordingly, when relatively sufficient spare sub-frequency resources exist, each frequency sharing system may use a corresponding sub-frequency resource solely. Accordingly, it is possible to solve a coexistence issue occurring between frequency sharing systems. In addition, by priorly assigning a sub-frequency resource assigned to a frequency sharing system using the same RAT, it is possible to reduce an amount of overhead, that is, control information used for an inter-system cooperation.

This is attributed to that an efficiency of frequency sharing between frequency sharing systems using the same RAT based on a self-coexistence mechanism is higher than an efficiency of frequency sharing between frequency sharing systems using different RATs based on an inert-system coexistence mechanism. Due to a difference between RATs, the frequency sharing systems using the different RATs may use a relatively large amount of overhead for an inter-system cooperation in order to effectively share a frequency in the same sub-frequency resource.

According to an embodiment of the present invention, it is possible to enhance an efficiency of frequency sharing.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Figure 6:
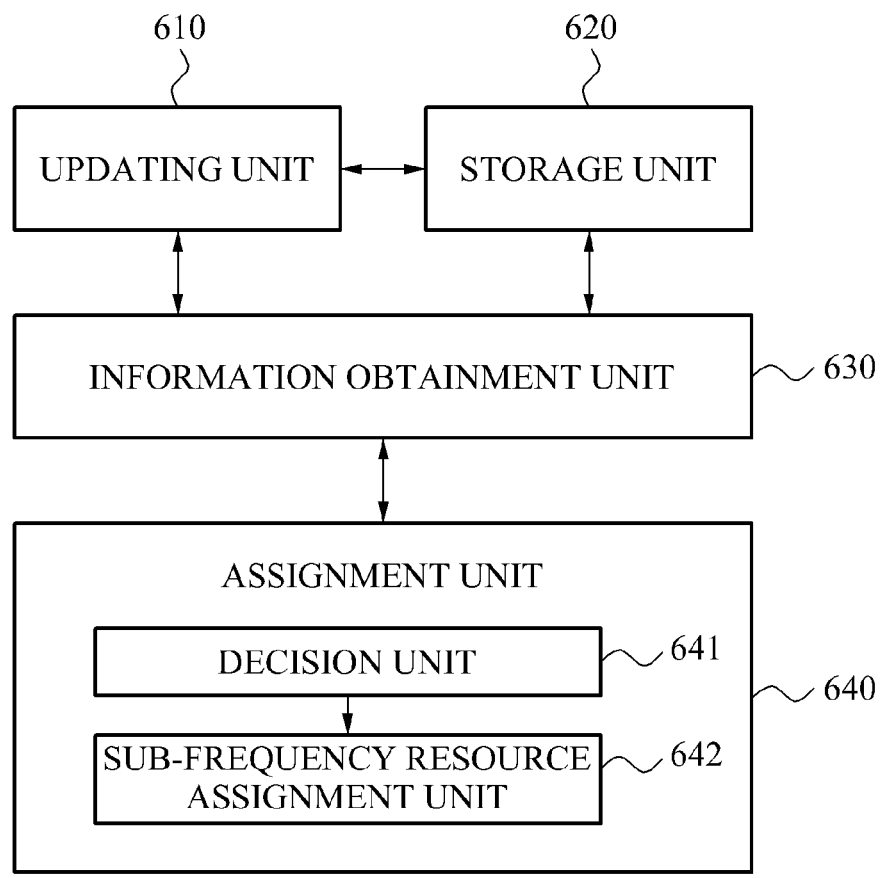
FIG. 6 is a block diagram illustrating a frequency assignment apparatus according to an embodiment of the present invention.

FIG. 6 is a block diagram illustrating a frequency assignment apparatus according to an embodiment of the present invention.

Referring to FIG. 6, the frequency assignment apparatus may include an updating unit 610, a storage unit 620, an information obtainment unit 630, and an assignment unit 640.

The information obtainment unit 630 may obtain information associated with a plurality of frequency sets with respect to a sub-frequency resource generated by dividing a target frequency resource assigned to an incumbent system. Each of the frequency sets may indicate a characteristic of a sub-frequency resource included in each of the frequency sets. The information obtainment unit 630 may obtain information associated with the frequency sets from the updating unit 610 or the storage unit 620.

The assignment unit 640 may assign at least one sub-frequency resource, belonging to one of the frequency sets, to at least one frequency sharing system discriminated from the incumbent system.

The assignment unit 640 may include a decision unit 641 and a sub-frequency resource assignment unit 642.

The decision unit 641 may determine whether a sub-frequency resource solely assignable to a first frequency sharing system discriminated from the incumbent system exists. When the sub-frequency resource solely assignable to the first frequency sharing system does not exist, the decision unit 641 may determine whether a sub-frequency resource assigned to a frequency sharing system using the same RAT as the first frequency sharing system exists.

The sub-frequency resource assignment unit 642 may assign the sub-frequency resource to the frequency sharing system based on the decisions. For example, when a spare sub-frequency resource exists, the sub-frequency resource assignment unit 642 may assign the corresponding sub-frequency resource to a single frequency sharing system. Here, the spare sub-frequency resource may include a sub-frequency resource included in an available set, or a sub-frequency resource included in a restricted available set, satisfying a particular condition.

When the spare sub-frequency resource does not exist, and when a sub-frequency resource assigned to only at least one frequency sharing system using the to same RAT as the first frequency sharing system exists, the sub-frequency resource assignment unit 642 may assign the corresponding sub-frequency resource to the first frequency sharing system.

When the spare sub-frequency resource does not exist, and when the frequency sharing system using the same RAT as the first frequency sharing system does not exist, the sub-frequency resource assignment unit 642 may assign, to the first frequency sharing system, a sub-frequency resource assigned to a frequency sharing system using a different RAT as the first frequency sharing system.

The updating unit 610 may update information associated with the plurality of frequency sets based on location information of the at least one frequency sharing system, a spectrum sensing result, or information associated with a frequency resource utilization of the incumbent system. The updating result may be stored in the storage unit 620. The updating unit 610 may update information associated with the frequency sets at predetermined time intervals, or as necessary such as an assignment request, and the like. Also, the updating unit 610 may include a monitoring unit (not shown) to monitor the location information, the spectrum sensing result, or information associated with the frequency resource utilization of the incumbent system.

The storage unit 620 may store information associated with the frequency sets.

The frequency assignment apparatus may be included within a frequency sharing system, or may be provided separate from the frequency sharing system.

The frequency assignment apparatus in the environment where the incumbent system exists according to an embodiment of the present invention is described above. It is understood that the descriptions made above with reference to FIG. 1 through FIG. 5 may be applicable as is and thus, further descriptions will be omitted here.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

The invention claimed is:

1. A method in a present frequency sharing system of assigning a frequency in an environment where an incumbent system exists, the present frequency sharing system using a radio access technology (RAT) for communications, the method comprising:
   determining whether a sub-frequency resource solely assignable to the present frequency sharing system discriminated from the incumbent system exists, the sub-frequency resource being generated by dividing a target frequency resource assigned to the incumbent system;
   assigning to the present frequency sharing system the sub-frequency resource solely assignable to the present frequency sharing system, when it is determined that the sub-frequency solely assignable to the present frequency sharing system exists;
   determining whether a sub-frequency resource assigned to a frequency sharing system using the same RAT as the present frequency sharing system exists, when it is determined that the sub-frequency resource solely assignable to the frequency sharing system does not exist;
   assigning to the present frequency sharing system the sub-frequency resource assigned to the frequency sharing system using the same RAT, when it is determined that the sub-frequency resource assigned to the frequency sharing system using the same RAT exists, wherein the present frequency sharing system in the sub-frequency resource and the frequency sharing system using the same RAT share the sub-frequency resource according to a self-coexistence coexistence mechanism; and
   otherwise assigning to the present frequency sharing system a sub-frequency resource assigned to a frequency sharing system using a different RAT than the present frequency sharing system, when it is determined that the sub-frequency resource assigned to the frequency sharing system using the same RAT does not exist, wherein the present frequency sharing system in the sub-frequency resource and the frequency sharing system using the different RAT share the sub-frequency resource according to an inter-system coexistence mechanism.

2. The method of claim 1, wherein:
   the determining whether the sub-frequency resource solely assignable to the present frequency sharing system exists comprises determining whether an available sub-frequency resource that is unused by the incumbent system and satisfies at least predetermined channel quality and thus, is solely assignable to the present frequency sharing system exists, and assigning the available sub-frequency resource to the present frequency sharing system when the available sub-frequency resource exists.

3. The method of claim 2, wherein:
the determining whether the sub-frequency resource solely assignable to the present frequency sharing system exists comprises determining whether a restrictively available sub-frequency resource restrictively assignable to the present frequency sharing system according to a frequency band related regulation exists, when the available sub-frequency resource does not exist.

4. The method of claim 3, wherein:
the determining whether the restrictively available sub-frequency resource exists comprises determining that the sub-frequency resource solely assignable to the present frequency sharing system does not exist, when the restrictively available sub-frequency resource does not exist.

5. The method of claim 3, wherein:
the determining whether the restrictively available sub-frequency resource exists comprises determining whether the present frequency sharing system is capable of satisfying a regulation about the restrictively available sub-frequency resource when the restrictively available sub-frequency resource exists, and
the assigning comprises assigning the restrictively available sub-frequency resource to the present frequency sharing system to satisfy the regulation about the restrictively available sub-frequency resource, when the present frequency sharing system is capable of satisfying the regulation.

6. The method of claim 5, wherein:
the determining whether the present frequency sharing system is capable of satisfying the regulation about the restrictively available sub-frequency resource comprises determining that the sub-frequency resource solely assignable to the present frequency sharing system does not exist when the present frequency sharing system is incapable of satisfying the regulation.

7. The method of claim 1, wherein:
the assigning of the sub-frequency resource assigned to the frequency sharing system using the same RAT comprises priorly assigning, to the present frequency sharing system, a sub-frequency resource assigned to a relatively small number of frequency sharing systems among sub-frequency resources assigned to the frequency sharing system using the same RAT.

8. The method of claim 1, wherein:
the assigning of the sub-frequency resource assigned to the frequency sharing system using the different RAT comprises priorly assigning, to the present frequency sharing system, the sub-frequency resource assigned to a relatively small number of frequency sharing systems among sub-frequency resources assigned to the frequency sharing system using the different RAT.

9. The method of claim 1, further comprising:
obtaining assignment information associated with the sub-frequency resource.

10. An apparatus in a present frequency sharing system for assigning a frequency in an environment where an incumbent system exists, the present frequency sharing system using a radio access technology (RAT) for communications, the apparatus comprising:
a decision unit, the decision unit being configured to determine whether a sub-frequency resource solely assignable to the present frequency sharing system discriminated from the incumbent system exists, the sub-frequency resource being generated by dividing a target frequency resource assigned to the incumbent system;
a sub-frequency resource assignment unit, the sub-frequency resource assignment unit being configured to assign to the present frequency sharing system the sub-frequency resource solely assignable to the present frequency sharing system, when it is determined that the sub-frequency solely assignable to the present frequency sharing system exists;
the decision unit being further configured to determine whether a sub-frequency resource assigned to a frequency sharing system using the same RAT as the present frequency sharing system exists, when it is determined that the sub-frequency resource solely assignable to the present frequency sharing system does not exist; and
the sub-frequency resource assignment unit being further configured to assign to the present frequency sharing system the sub-frequency resource assigned to the frequency sharing system using the same RAT, when it is determined that the sub-frequency resource assigned to the frequency sharing system using the same RAT exists, wherein the present frequency sharing system in the sub-frequency resource and the frequency sharing system using the same RAT share the sub-frequency resource according to a self-coexistence coexistence mechanism; and
the sub-frequency resource assignment unit being further configured to otherwise assign to the present frequency sharing system a sub-frequency resource assigned to a frequency sharing system using a different RAT than the present frequency sharing system, when it is determined that the sub-frequency resource assigned to the frequency sharing system using the same RAT does not exist, wherein the present frequency sharing system in the sub-frequency resource and the frequency sharing system using the different RAT share the sub-frequency resource according to an inter-system coexistence mechanism.

11. The apparatus of claim 10, wherein:
the decision unit being further configured to determine whether an available sub-frequency resource that is unused by the incumbent system and satisfies at least predetermined channel quality and thus, is solely assignable to the present frequency sharing system exists, and
when the available sub-frequency resource is determined to exist, the sub-frequency resource assignment unit is further configured to assign the available sub-frequency resource to the present frequency sharing system.

12. The apparatus of claim 11, wherein:
when the available sub-frequency resource is determined not to exist, the decision unit is further configured to determine whether a restrictively available sub-frequency resource restrictively assignable to the present frequency sharing system according to a frequency band related regulation exists.

13. The apparatus of claim 12, wherein:
when the restrictively available sub-frequency resource is determined not to exist, the decision unit is further configured to determine that the sub-frequency resource solely assignable to the present frequency sharing system does not exist.

14. The apparatus of claim 12, wherein:
when the restrictively available sub-frequency resource is determined to exist, the decision unit is further configured to determine whether the present frequency sharing system is capable of satisfying a regulation about the restrictively available sub-frequency resource, and when the present frequency sharing system is determined to be capable of satisfying the regulation, the sub-frequency resource assignment unit is further configured to assign the restrictively available sub-frequency resource to the present frequency sharing system to satisfy the regulation about the restrictively available sub-frequency resource.

15. The apparatus of claim 14, wherein:

when the present frequency sharing system is determined to be incapable of satisfying the regulation, the decision unit is further configured to determine that the sub-frequency resource solely assignable to the present frequency sharing system does not exist.

16. The apparatus of claim 10, further comprising:

an information obtainment unit, the information obtainment unit being configured to obtain assignment information associated with the sub-frequency resource.

* * * * *